(12) United States Patent
Maisey et al.

(10) Patent No.: US 10,760,797 B2
(45) Date of Patent: Sep. 1, 2020

(54) AIR OR SPRAY WASHER FOR AIR CONDITIONING UNITS

(71) Applicants: Grahame Ernest Maisey, Wyncote, PA (US); Beverly Milestone, Wyncote, PA (US)

(72) Inventors: Grahame Ernest Maisey, Wyncote, PA (US); Beverly Milestone, Wyncote, PA (US)

(*) Notice: Subject to any disclaimer, the term of this patent is extended or adjusted under 35 U.S.C. 154(b) by 0 days.

(21) Appl. No.: 16/205,385

(22) Filed: Nov. 30, 2018

(65) Prior Publication Data
US 2019/0162430 A1    May 30, 2019

Related U.S. Application Data

(60) Provisional application No. 62/592,589, filed on Nov. 30, 2017, provisional application No. 62/626,202, filed on Feb. 5, 2018.

(51) Int. Cl.
| | |
|---|---|
| *F24F 3/14* | (2006.01) |
| *F24F 6/14* | (2006.01) |
| *F24F 12/00* | (2006.01) |
| *F24F 5/00* | (2006.01) |

(52) U.S. Cl.
CPC .......... *F24F 3/1417* (2013.01); *F24F 5/0014* (2013.01); *F24F 6/14* (2013.01); *F24F 12/001* (2013.01); *F24F 2006/143* (2013.01); *F24F 2006/146* (2013.01)

(58) Field of Classification Search
CPC .......... F24F 3/1417; F24F 5/0014; F24F 6/14; F24F 12/001; F24F 2006/143; F24F 2006/146; F24F 3/1411; F24F 2003/1617
See application file for complete search history.

(56) References Cited

U.S. PATENT DOCUMENTS

| | | | |
|---|---|---|---|
| 3,267,648 A | 8/1966 | Allcorn, Jr. | |
| 4,399,864 A * | 8/1983 | Lamar | F24F 3/14 165/229 |
| 4,494,596 A * | 1/1985 | Bradshaw | F24F 3/14 165/101 |
| 4,604,108 A * | 8/1986 | Cotton, Jr. | F24F 3/14 261/DIG. 34 |
| 6,059,866 A * | 5/2000 | Yamagata | B01D 45/08 96/251 |
| 6,059,899 A | 5/2000 | Shibata | |
| 6,293,121 B1 * | 9/2001 | Labrador | B01D 61/10 62/304 |
| 6,451,096 B1 | 9/2002 | Kim | |
| 6,497,757 B2 * | 12/2002 | Wakamatsu | B01D 47/06 96/290 |

(Continued)

*Primary Examiner* — Cassey D Bauer
(74) *Attorney, Agent, or Firm* — Riverside Law LLP

(57) ABSTRACT

A system for purifying and pre-conditioning intake air in an air conditioning unit comprises an energy exchange unit having an air inlet, an air outlet, a primary air flow running from the air inlet to the air outlet, and an active energy exchanging element or elements, and at least one spray washer having at least one nozzle, the spray washer positioned between the air inlet and the next active element, wherein the at least one spray washer is configured to dispense droplets of a fluid into the intake air from the at least one nozzle. A method for purifying and pre-conditioning intake air in an air conditioning unit is also described.

18 Claims, 5 Drawing Sheets

(56) References Cited

U.S. PATENT DOCUMENTS

| | | | | |
|---|---|---|---|---|
| 6,645,273 B2* | 11/2003 | Wakamatsu | ............ | B01D 47/06 95/199 |
| 6,743,279 B2* | 6/2004 | Cataldo | .................. | B01D 47/06 422/28 |
| 6,863,716 B2* | 3/2005 | Chen | ...................... | B01D 47/06 96/297 |
| 6,946,021 B2 | 9/2005 | Aoyagi | | |
| 9,358,490 B2 | 6/2016 | Tsao | | |
| 9,631,824 B1 | 4/2017 | Maisey | | |
| 9,719,423 B2* | 8/2017 | Motakef | .................. | F02C 7/047 |
| 2010/0275629 A1* | 11/2010 | Erickson | ............... | F24F 3/1417 62/271 |
| 2011/0042836 A1* | 2/2011 | Zhang | ........................ | F02C 7/04 261/101 |
| 2013/0186117 A1* | 7/2013 | Desai | ...................... | F02C 7/143 62/94 |
| 2014/0260371 A1* | 9/2014 | Vandermeulen | ...... | F24F 3/1417 62/92 |
| 2015/0292754 A1* | 10/2015 | Mongar | ................ | F24F 3/1417 62/94 |

\* cited by examiner

AIR OR SPRAY WASHER FOR AIR CONDITIONING UNITS

CROSS-REFERENCE TO RELATED APPLICATIONS

This application claims priority to U.S. Provisional Patent Application No. 62/592,589, filed on Nov. 30, 2017, and No. 62/626,202, filed Feb. 5, 2018, both of which are incorporated herein by reference in their entirety.

FIELD OF THE INVENTION

This invention relates to conventional air conditioning units with cooling and heating coils, and in some embodiments specifically to liquid desiccant air conditioning (LDAC) units and systems, the LDAC systems having conditioner units and energy recovery/regenerator units. Exemplary conditioner and energy recovery/regenerator units comprise a series of vertical media pads, membranes, or coils, sometimes arranged in parallel, positioned in one or more sumps containing a quantity of liquid desiccant. Such systems typically comprise a cross-flow system wherein air moves in a generally horizontal direction and the liquid desiccant moves in a generally vertical direction. The present invention relates to the addition of a spray washer to help clean and in some embodiments pre-condition the incoming air prior to the air reaching the first of the media pads, membranes, or coils. The present invention may be used with any air conditioning system with an air intake, and relates in part to other forms of air conditioning wherein a water or desiccant air or other fluid washer is used as a pre-conditioner or post conditioner.

BACKGROUND OF THE INVENTION

Some liquid desiccant air conditioning systems utilize a series of vertical media pads, membranes, or coils in parallel. In some exemplary embodiments, the pads, membranes, or coils are wetted with a liquid desiccant solution and air is pulled through them, for example to cool and dry hot humid air by removing moisture and heat, or to warm and humidify intake air by warming and discharging moisture into it. Some or all of the air may flow through the system and provide a series of tasks to condition the air which will exit into a space or be used for a purpose, for example to cool a room in a home or building or outside a home or building. Some air conditioning systems and LDAC systems have vertical cooling and heating coils or vertical media pads that can be supplemented with a spray washer to pre-condition the incoming air. The incoming air may comprise, for example, air which has been recirculated through a building, outside air, or a mixture of the two.

In most environments, outside air and return or exhaust air includes particulate matter and possibly polluted air, and thus the air being fed into the air conditioner may be contaminated. This incoming air may come in direct contact with the first of the vertical media pads, membranes, or coils, or it may first be passed through a filter. In either case, the air that reaches the first of the media pads, membranes, or the cooling or heating coils is still considered dirty and polluted. In instances where a filter is included, filters may become clogged over time, reducing efficiency of the air conditioner if they are not regularly cleaned or replaced. Replacement filters, in turn, are costly and wasteful. Therefore, a system that first washes the incoming air, eliminating much of the particulate matter and other contaminants before that matter comes into contact with the first vertical media pad, filter, membrane, or coil is advantageous. The particulate matter and other contaminants collected by the fluid may be captured by a strainer or filter on a discharge pipe from the sump. A similar idea is discussed in U.S. Pat. No. 7,306,650, to Slayzak, et al., but the system described in Slayzak has a vertical air stream in the conditioner, is more complicated, and is more costly to implement and maintain because it involves trapping contaminants largely in filter pads which then require changing. No system currently washes and eliminates most of the particulate matter and other contaminants in the incoming horizontal air stream using a fluid, water or liquid desiccant.

For the foregoing reasons, there is a need in the art for an LDAC system or conventional air conditioning system including one or more air washers or eliminators in order to optimize the work of both the air washers and the media pads, membranes, or coils, lengthen the life cycle of the media pads, membranes, or coils and ease their maintenance. The present invention satisfies this need.

SUMMARY OF THE INVENTION

In one aspect, a system for purifying intake air in an air conditioning unit comprises an energy exchange unit having an air inlet, an air outlet, a primarily horizontal air flow running from the air inlet to the air outlet, and a further active energy exchanging element or elements; and at least one spray washer having at least one nozzle, the spray washer positioned between the air inlet and the further active element or elements, wherein at least one spray washer is configured to dispense droplets of a fluid into the intake air from the at least one nozzle. In one embodiment, the system further comprises at least one eliminator element positioned between the spray washer and the next active energy exchanging element or after the final active energy exchange element or after intermediate energy exchange elements, wherein the at least one eliminator element is configured to trap droplets of fluid prior to the first, last, or intermediate active energy exchanging element.

In one embodiment, the air conditioning unit is an LDAC and the fluid is liquid desiccant. In one embodiment, the energy exchange unit is a conditioner unit. In one embodiment, the energy exchange unit is a recovery/regeneration unit. In one embodiment, the eliminator element comprises a plurality of fins. In one embodiment, the eliminator element is configured as a heat exchanger and changes the temperature of the air flow. In one embodiment, there is a separate heat exchanger for the air washer and changes the temperature of the air flow. In one embodiment, there is a separate heat exchanger for the air washer that also services the eliminator. In one embodiment, the separate heat exchanger also services one or more of the media pads, membranes or coils. In one embodiment, the system further comprises a sump positioned below the spray washers and the eliminator, configured to catch the droplets of liquid desiccant. In one embodiment the fluid serving the spray washer and other directly connected elements selected from the group consisting of eliminators, media pads, membranes and coils will be a different fluid than the fluid serving the other elements selected from the group consisting of media pads, membranes and coils. In one embodiment the fluid serving the spray washer and other directly connected elements will be the same fluid as the fluid serving the other elements from the group consisting of media pads, membranes and coils.

In one embodiment, the air conditioning unit is a conventional air conditioning unit and the fluid is water, liquid desiccant, or some other fluid. In one embodiment, the energy exchange unit is an evaporator. In one embodiment, the next active element is an evaporator coil. In one embodiment, the eliminator element comprises a plurality of fins. In one embodiment, the eliminator element is configured as a heat exchanger and changes the temperature of the primary air flow. In one embodiment, there is a separate heat exchanger for the air washer. In one embodiment, there is a separate heat exchanger for the air washer that also services the eliminator. In one embodiment, the separate heat exchanger also services one or more of the media pads, membranes or coils. In one embodiment, the next active element is positioned substantially perpendicular to the primarily horizontal air flow path.

In another aspect, a method of purifying a primarily horizontal flow of intake air in an air conditioning unit comprises the steps of driving a flow of intake air into an air inlet, rinsing the flow of intake air with droplets of fluid from a spray washer, collecting a first quantity of droplets in a sump, positioned below the spray washer and the eliminator element, and driving the rinsed air toward a next active element where the first active element is the spray washer. In one embodiment, the method further comprises the steps of driving the mixture of rinsed air and droplets of fluid toward an eliminator element, and catching a second quantity of droplets with the eliminator element, each droplet comprising a quantity of contaminant. The sump may also be positioned below the first or first several of the media pads, membranes or coils.

In one embodiment, the air conditioning unit is an LDAC, wherein the fluid is a liquid desiccant, and wherein the next active element is a media pad. In one embodiment, the air conditioning unit is an LDAC, wherein the fluid is a liquid desiccant, and wherein the next active element is a membrane. In one embodiment, the method further comprises the step of filtering a liquid comprising the second quantity of droplets and recirculating the filtered liquid into the spray washer. In one embodiment, the air conditioning unit is a conventional air conditioning unit and the liquid is water, liquid desiccant, or some other fluid, and wherein the next active element is an evaporator coil. In one embodiment, the air conditioning unit is a conventional air conditioning unit and the liquid is water, liquid desiccant, or some other fluid, and wherein the next active element is a heating coil. In one embodiment, the method further comprises the step of providing a heated or cooled fluid to the eliminator element, the eliminator element configured to heat or cool the rinsed air.

In one embodiment the air conditioning unit is an LDAC wherein there is a separate fluid from the group consisting of desiccant, water, or fluid for the air washer. In one embodiment, the separate fluid, water or desiccant may also serve the eliminator. In one embodiment, the separate fluid, water or desiccant may also serve one or more of the media pads or membranes.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
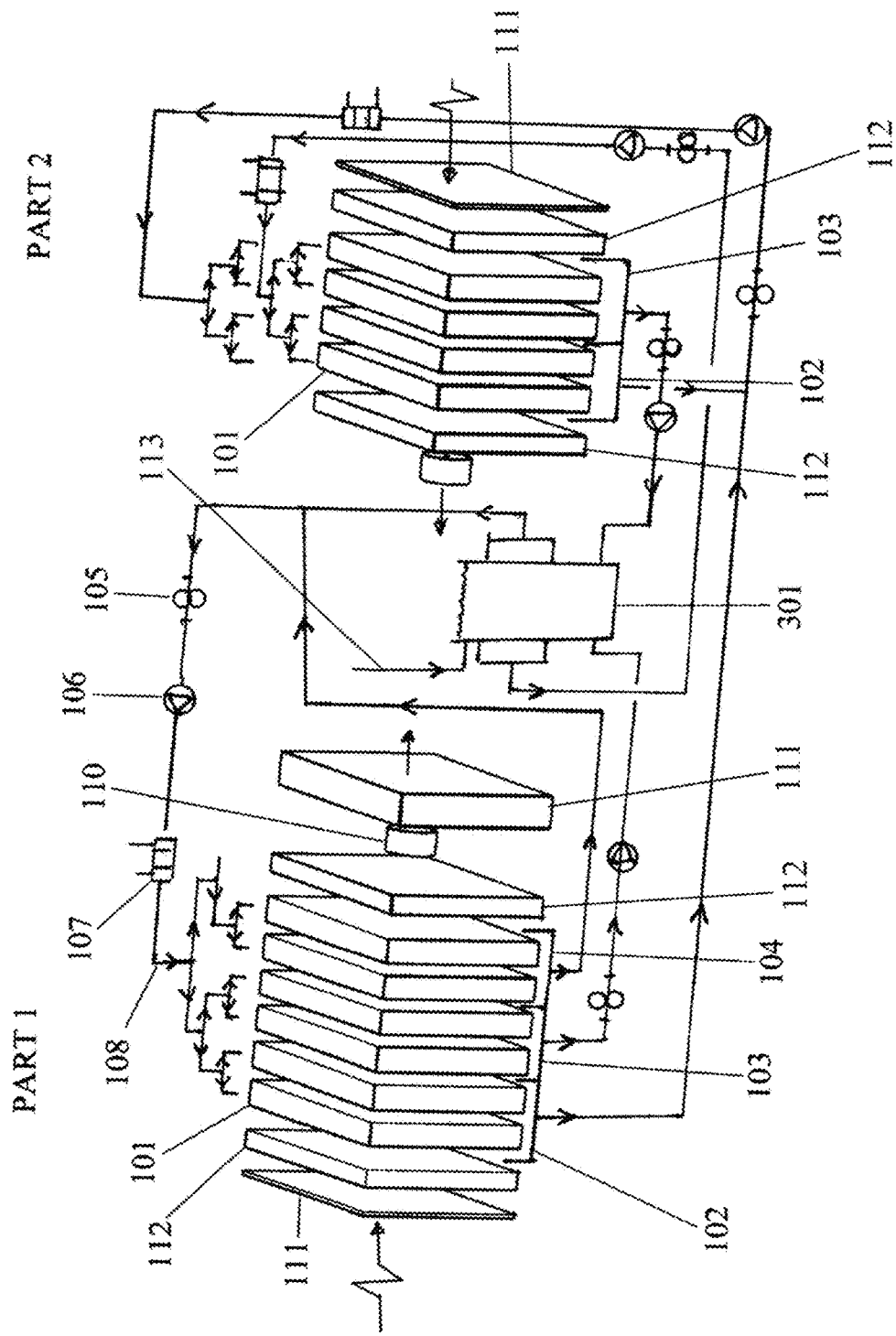
FIG. 1 is an exemplary schematic of an LDAC system.

It is to be understood that the figures and descriptions of the present invention have been simplified to illustrate elements that are relevant for a clearer comprehension of the present invention, while eliminating, for the purpose of clarity, many other elements found in climate control systems and methods and gates in collection sumps. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which the invention belongs. Although methods and materials similar or equivalent to those described herein can be used in the practice or testing of the present invention, exemplary methods and materials are described herein.

The articles "a" and "an" are used herein to refer to one or more than one (i.e. to at least one) of the grammatical object of the article. By way of example, "an element" means one element or more than one element.

As discussed in further detail below, various embodiments disclosed herein describe methods and systems of reducing or eliminating contaminants in an air conditioning system. Certain embodiments relate to the addition of a spray washer or an eliminator, alone or in combination, in a conventional air conditioning system, for example an air conditioning system having vertical coils and a horizontal air flow. In another embodiment, the spray washer or eliminator may be added to an LDAC system, for example an LDAC system having a horizontal air flow and generally comprising a conditioner unit, a storage system or one or more sumps that act as a storage system, and an energy recovery/regenerator unit. Adding a spray washer to the air intake channel prior to the intake air reaching the next active element of the air conditioning system (for example, but not limited to, the heat exchanging coils in a conventional air conditioning system, or the media pads, membranes, or coils in an LDAC system) removes most of the particulate matter and the pollution gasses in the air flow prior to the air reaching the next active element. An intake air filter may also be considered the next active element in some embodiments, though in other embodiments the intake air passes through a filter prior to flowing through the spray washer. In some embodiments, a rougher or more permissive intake air filter may be used in LDAC or conventional AC systems including a spray washer of the present invention. One example of an LDAC system for use with the present invention is found in U.S. Pat. No. 9,631,824 to Maisey, et al., the entire contents of which is incorporated herein by reference.

Advantageously, the spray washer may also condition the air. The next active element will therefore have a longer life, and require much less cleaning and less preventive maintenance. In some embodiments, the spray washer will inject water or liquid desiccant or some other fluid droplets into the intake air stream, which is then passed through an eliminator to eliminate droplets before reaching the first media pad, membrane, or coil. In some embodiments, the eliminator serves a dual purpose, and is also configured to cool or warm the air as needed. The eliminator may optionally be excluded, for example in the energy recovery/regenerator unit of an LDAC system, as the media pads, membranes, or coils will serve the eliminator's function of removing droplets of fluid from the intake air. The eliminator can also be excluded in the conditioner unit where the presence of some small droplets in the supply air stream from the conditioner do not pose a particular problem or where there are a sufficient number of media pads, membranes, or coils in the conditioner unit to effectively remove all micro droplets from the air stream.

In accordance with one or more embodiments, the system comprises a spray washer or washers positioned prior to the first media pad, membrane, or coil in the conditioning unit of a conventional style air conditioning unit with horizontal air flow or of a liquid desiccant air conditioning system, with horizontal air flow and vertical desiccant flow.

In one embodiment, there is a separate heat exchanger for the air washer and changes the temperature of the primary air flow. In one embodiment, there is a separate heat exchanger for the air washer that also services the eliminator. In one embodiment, the separate heat exchanger also services one or more of the media pads, membranes or coils.

In one embodiment the air conditioning unit is an LDAC wherein there is a separate fluid from the group including liquid desiccant, water, or fluid for the air washer. In one embodiment, the separate fluid, water or liquid desiccant may also serve the eliminator. In one embodiment, the separate fluid, water or liquid desiccant may also serve one or more of the media pads or membranes.

It is understood that the orientations described herein are examples, and that a variety of other configurations may be appropriate depending on the application. For example, if a system of the present invention is described as having a horizontal air flow and a vertical desiccant flow, it is understood that in some embodiments of the present invention, the important aspect is the relative perpendicular angle of the two flows. Therefore, in some embodiments, some or all features of the present invention could also advantageously be applied to an LDAC system having a substantially vertical airflow and a substantially horizontal desiccant flow. In other embodiments, some or all features of the present invention could be applied to a system with a desiccant flow at an angle off vertical, and an air flow substantially perpendicular to that angle, such that the air flow meets the next active element of the air conditioning system (for example the first media pad, membrane, or coil) at an angle of approximately 90°. Although several examples described herein relate to a primary air flow perpendicular to one or more media pads, membranes, coils, or active elements, it is understood that other angles may also be used, for example about 80°, about 70°, about 60°, or any other suitable angle in order to provide an air flow and sufficient heat and humidity exchange with the one or more active elements.

The various spray washers described herein may comprise any suitable configuration, position, and orientation, though in one embodiment they are positioned in the intake air path prior to the intake air arriving at the next active element of the air conditioning system. In other embodiments, spray washers may additionally or alternatively be positioned in the exhaust path of exhaust air, after the exhaust air has travelled past or through the final active element on its way to the exhaust air outlet. In some embodiments, a system of the present invention comprises a single spray washer comprising a vertical pipe having a plurality of nozzles to dispense fluid, the nozzles oriented in the opposite direction of the intake air flow. In other embodiments, a spray washer may comprise only a single nozzle, or a plurality of nozzles with some nozzles having an orientation that is different from others with respect to the intake air flow.

In other embodiments, spray washers of the present invention may comprise multiple pipes, or a single long pipe extending in a zig-zag, circular, or square pattern around the intake air pathway, in order to optimally clean, humidify or dehumidify, and heat or cool the incoming air. In one embodiment, a spray washer of the present invention comprises two banks of nozzles facing one another, on opposite sides of the intake air channel, pointing inward toward the center of the air channel. The embodiments described above are not meant to be limiting, and any configuration of pipes, fluid channels, or nozzles is envisioned which may be configured to deliver sufficient fluid to the intake air in order to remove particulates or impurities.

Spray nozzles may have a variety of configurations and spray patterns, for example but not limited to a "shower" type spray, a substantially conical spray pattern, a substantially flat spray pattern, or a fountain-type spray emanating from a sump positioned in the bottom of an air conditioning unit or from a storage tank containing the fluid and piped directly to the sprays of the present invention. In some embodiments, the spray patterns of some or all nozzles are stationary over time, but in some embodiments the nozzle moves or turns about an axis over time so as to distribute the spray of fluid over a wider volume.

In some embodiments, the system comprises one or more eliminators positioned in the air intake path, prior to the first media pad, membrane, or coil but after the spray washer or washers as described above. In one embodiment, the eliminator or eliminators serve to remove fluid droplets from the intake air prior to the intake air hitting the next active element (for example the first media pad, a membrane, a coil, or any other suitable cooling or warming element). The eliminators may be constructed from various metals or other structural materials including but not limited to graphite, fiberglass, boron, plastic, etc. The configuration of the eliminators is so the entrapment of droplets from the sprays and their movement to the sump at the base of the units is accomplished. There are several typical zig-zag shapes and snake like shapes used for this purpose. In some embodiments, the eliminators comprise a plurality of fins. The fins of the present invention typically have a substantially greater length and width than their thickness, and may be configured to be parallel to the intake air flow, such that they do not add significant drag to the intake air flow, but still present maximal surface area to the intake air in order to allow vapor, containing particulates and contaminants, to collect on the fins. In some embodiments, the fins in the eliminator are v-shaped, so that intake air is driven around the v-shaped fins on its way to the next active element. This has the effect of precluding any air from traveling in a straight path from intake to the next active element, further reducing the amount of contaminant that reaches the next active element.

In some embodiments, eliminators of the present invention are used to eliminate micro droplets from the intake air prior to the intake air reaching the first media pad or pads, membrane(s) or coil(s) in a liquid desiccant air conditioning system. The eliminator removes droplets of fluid from the intake air before the intake air reaches the first media pad, membrane, or coil. The eliminator can also serve to cool or warm the air, because the plurality of fins can be configured to act as a heat exchanger. In some embodiments, a flow of warming or cooling fluid is provided to the eliminator, facilitating heat exchange with the intake air as it passes the eliminator.

FIG. 1 is an exemplary illustration for an embodiment of a liquid desiccant air conditioning system. In this illustrative embodiment, the airstream enters at the supply side of the conditioner unit PART 1, and may pass through an optional filter 111 and then through an optional heating/cooling coil 112, which is connected to an external source to preheat or precool the air or to an energy recovery source from the energy recovery/regenerator unit PART 2. The air then passes sequentially over absorbent media pad or pads 101 that have been wetted with a specific concentration and temperature of a liquid desiccant for the desired (specified) amount of humidity and temperature required in the supply or process air. The supply or process air is cooled and dehumidified where necessary by cooling a concentrated liquid desiccant and heated and humidified where necessary by heating a diluted liquid desiccant. A heat exchanger 107 in the liquid desiccant piping may heat or cool the liquid desiccant using an external heat source or energy recovery source. The air may also be filtered, purified, and sterilized through contact with the liquid desiccant wetted media pads 101. The air then passes through an optional conditioning coil 112 through the fan 110 and then through an optional filter 111 and then exits at the opposite side to the entry side, the air being drawn through or pushed through the device by a fan 110 to a space or process served. The liquid desiccant piping 108 has optional strainers 105 to remove particulates from the desiccant and pumps 106 moving the desiccant through the supply pipework 108 to the sparge pipework 109 which supplies liquid desiccant to the media pads. The liquid desiccant flows down the media pads 101 and into either an optional energy recovery sump 102, a sump 103, or an optional desiccant recirculating sump 104. The liquid desiccant flowing into the energy recovery sump 102 flows through pipes to the media pads 101 in the energy recovery/ regenerator unit PART 2 through which exhaust air or some other air source passes. There is an optional heat exchanger 107 in the liquid desiccant piping that will heat or cool the liquid desiccant using an external heat source or energy recovery source. The air in the energy recovery/regenerator unit PART 2 may first pass through a filter 111. The air may pass through an optional heating or cooling coil 112. An external heat source may be used or the exhaust air from the conditioned space/process or some other convenient useful source of airflow may be used as an energy recovery source. The energy recovery/regenerator will add moisture to the concentrated liquid desiccant or remove moisture from the diluted liquid desiccant. The air may then pass through an optional coil 112 to recover energy prior to exhausting. The air then exits to the opposite side from where it entered, drawn through or pushed through the device by a fan 110 to be exhausted to the outside. The now regenerated or energy recovered liquid desiccant goes into one or more storage tanks 301 where it is held in reserve or it may be stored in a sump 103 on the energy recovery/regenerator unit or it may be recirculated from the energy recovery/regenerator sump 102 back into the energy recovery/regenerator unit PART 2 for further energy recovery or regeneration. The liquid desiccant from the sump 103 is then piped into the storage tank 301 or forms a storage system of its own. The liquid desiccant from the recirculating sump 104 in the conditioner unit PART 1 is piped back to mix with the liquid desiccant from the storage system and flows back into the conditioner unit PART 1. In winter, or when more humidity is needed for the space or process, water is piped 113 into the liquid desiccant being held in the storage system. In summer, or when water is condensed or evaporated from the diluted liquid desiccant, it will be exhausted outside or optionally recovered and stored. The liquid desiccant in the storage system passes through an optional heat exchanger 107 that is attached to an external heating or cooling source to preheat or precool the liquid desiccant and then through the energy recovery/regenerator unit PART 2 before returning to the storage system 301 or sump 103 in the energy recovery/ regenerator. The pipework shall have valves of appropriate size and type for isolation of parts and systems and control of fluids wherever necessary. There are controls for temperature, humidity, level and flow where appropriate.

Cold, dry air, when entering the conditioner unit PART 1, is warmed and absorbs moisture to a specified temperature and humidity level before it enters the space/process being served. Warm, moist air, when entering the conditioner unit PART 1, is cooled and dehumidified to a specified temperature and humidity level before entering the space/process being served. The air may be 100% outside air or may be mixed with recirculated air or may be 100% recirculated air. The ability of the conditioner unit PART 1 to filter, purify, and sterilize the air to a certain degree, enables the use of less mechanical filtration and thereby reduces the system pressure losses and fan power necessary to move the air, minimizing electrical use year round. The ability of the media pads 101 to condition the air and require less coils or eliminate coils reduces the system pressure losses and fan power necessary to move the air, minimizing electric power use year round.

The liquid desiccant is concentrated when it is required to dehumidify and diluted when required to humidify. In this illustrative embodiment, the liquid desiccant concentration level is controlled by a mechanism in the storage tank(s) 301 or energy recovery/regenerator unit sump 103 sensing the desiccant level to achieve the desired level and therefore concentration for the system mode of either dehumidification where the level may be lower, or humidification where the level may be higher. Other forms of the liquid desiccant concentration control are optional.

Low grade heat and cooling and very low amounts of electricity may be used even during the high summer months to provide cool, dry air to a space/process or during the high winter months to provide warm moist air. The only electricity required in most cases is for small pumps 106 for pumping around the liquid desiccant and warming and cooling fluids and fans 110 to move the air in the conditioner unit PART 1 and the regenerator/energy recovery unit PART 2 in the exhaust air system or the regenerator unit and exhaust units. The disclosed system has low frictional resistance through the units for minimum fan power requirements and is able operate on low temperature warming fluid for warming and humidification and high temperature cooling fluid for cooling and dehumidifying together with energy or heat recovery systems and has the ability to filter, purify and sterilize the air passing through. The low grade heat and cooling sources may be such that clean, renewable sources may provide most of the heating and cooling, such as ground heat exchange for the cooling and prewarming and solar thermal for dehumidification and warming.

Systems airflow sizes may be from 5 L/s to 50,000 L/s (liters per second) with single or multiple height media pad sections, giving the system the ability to be easily produced in both large sizes for commercial, institutional and industrial use and in small sizes for residential and single room applications. Multiple media pad sections may increase the size of the system through stacking or adjacent sections. The system may be a stand-alone air unit or be the treatment section for the outside air for a larger HVAC (Heating, Ventilating and Air Conditioning) unit.

Figure 2A:
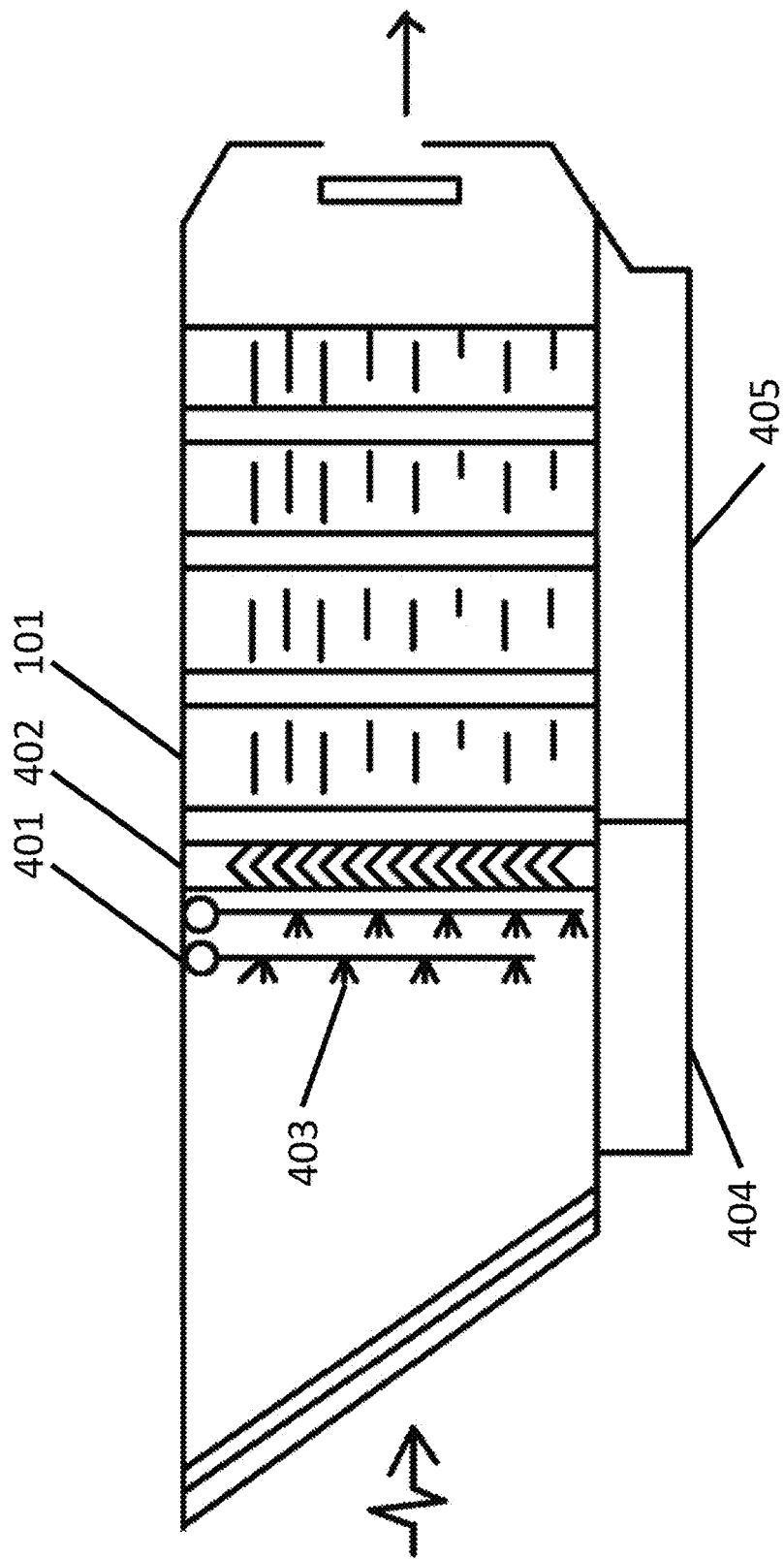
FIG. 2A is an exemplary schematic of a conditioner unit of an LDAC system.

With reference to FIG. 2A, an exemplary embodiment of a conditioner unit for a liquid desiccant air conditioning system is shown, with the air flowing horizontally left to right and the liquid desiccant flowing vertically down. The spray washers 401 each have a plurality of spray nozzles 403, and are located at the air intake side of the conditioner unit prior to the eliminator 402 and the first media pad, membrane, or coil 101. The intake air is sprayed with water, fluid, or liquid desiccant by the nozzles 403 in the spray washers 401. This has the effect of trapping some of the particulate matter and pollution gases in droplets of either water, fluid, or liquid desiccant. Some of those droplets are carried downward by gravity into the sump 404, and others first flow with the intake air to the eliminator 402. A portion of the droplets that reach the eliminator 402 will condense on or be trapped by the eliminator 402, and will then flow or drip downward into sump 404. In one embodiment, the spray washers are fed by a pump with a separator or filtering element attached to the inlet, which pumps fluid, water, or liquid desiccant from sump 404. The spray washers 401 and the eliminator 402 can also act to condition the air by pre-cooling or pre-warming the air depending upon the temperature of the water, fluid, or liquid desiccant that is being sprayed. The spray washers 401 and the eliminator 402 can also act to condition the air by dehumidifying or humidifying the air depending upon the humidity of the air and the concentration of the water, fluid, or liquid desiccant or the temperature of the liquid that is being sprayed. The eliminator or eliminators 402 are located between the spray washers 401 and the first media pad, membrane, or coil 101. The one or more eliminators 402 remove droplets of the water, fluid, or liquid desiccant that were sprayed into the air by the spray washer 401, along with any contaminants trapped by those droplets. The eliminator 402 can also serve as a heat exchanger for cooling or warming the intake air.

Figure 2B:
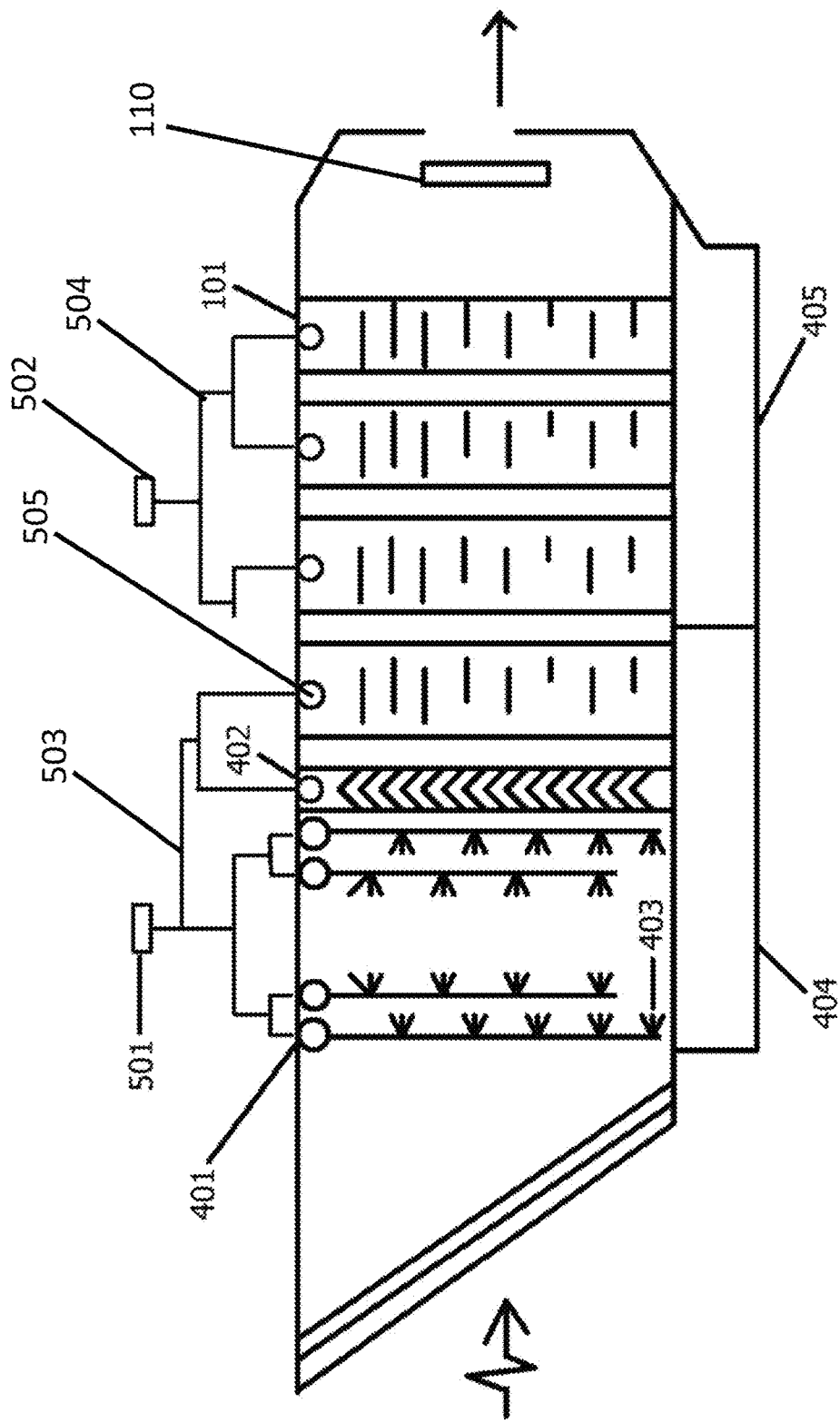
FIG. 2B is an exemplary schematic of a conditioner unit of an LDAC system.

With reference now to FIG. 2B, an alternative exemplary embodiment of a conditioner unit for a liquid desiccant air conditioning system is shown. The embodiment of FIG. 2B includes separate heat exchangers 501 for the air washer and can also be used for the eliminator. The heat exchanger 501 can also serve the first media pad, membrane or coil. A second heat exchanger, for example heat exchanger 502, can be used for the next media pad(s), membrane(s) or coil(s). Distribution piping 503, 504 dispenses one or more fluids, for example liquid desiccant, from the heat exchangers 501, 502 to the sparge pipes 505, which in turn supply a flow of fluid to the media pads, membranes, or coils 101. Distribution piping 503 also supplies the spray washers 401, and/or the eliminator 402.

With the above described system in place, far fewer contaminants in the form of air pollution, particulates, or the like, will reach first media pad, membrane, or coil 101, and even fewer will reach subsequent media pads, membranes, or coils. This advantageously leads not only to cleaner air being passed through the conditioner unit and into the space being climate controlled, but also leads to cleaner water, fluid, or liquid desiccant in the sumps. Because LDAC systems recirculate the liquid desiccant from one sump to another, sometimes via pumps, less contamination of the liquid desiccant means less filtering is necessary, lowering fan power requirements, maintenance cost and effort, allowing for the elimination of a filter or filters on the air intake.

Figure 3:
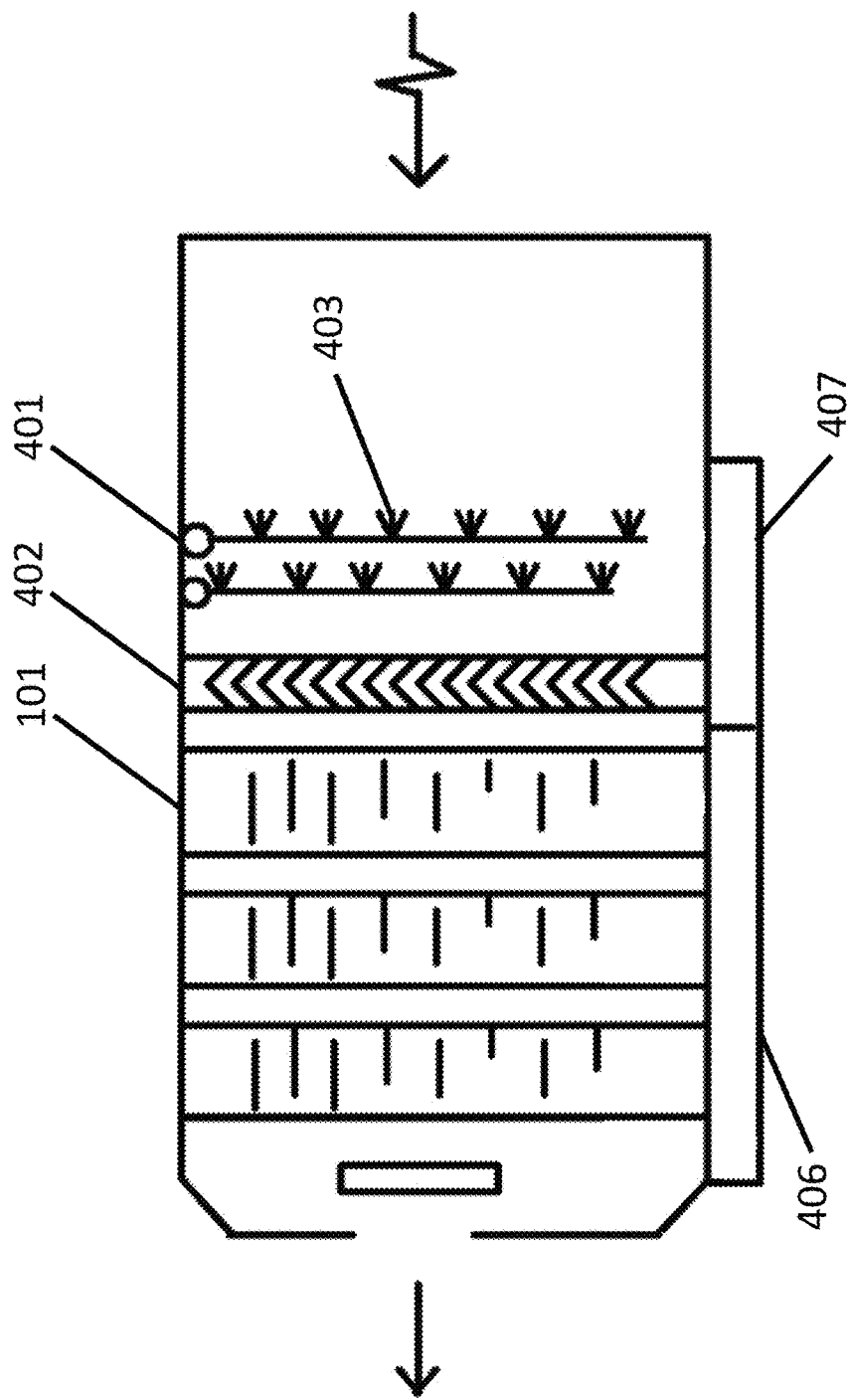
FIG. 3 is an exemplary schematic of an energy recovery/regeneration unit of an LDAC system.

Referring now to FIG. 3, an exemplary embodiment of a liquid desiccant air conditioning system's energy recovery/regenerator unit is shown, with the air flowing horizontally right to left and liquid desiccant flowing vertically down. Spray washers 401 having a plurality of nozzles 403 are located at the air intake side of the energy recovery/regenerator unit prior to the eliminator 402 and the first media pad, membrane, or coil 101. The intake air is sprayed with water, fluid, or liquid desiccant by the spray washers 401 to remove particulate matter and pollution gases. Although two spray washers are shown here and in FIG. 1, it is understood that one spray washer, three spray washers, or any other number or configuration of spray washers may be used in systems of the present invention as appropriate. The spray washer or washers can also act to condition the air by pre-cooling or pre-warming the air, by adjusting the temperature of the water, fluid, or liquid desiccant that is being sprayed.

The one or more eliminators 402 are located between the spray washers 401 and the first media pad, membrane, or coil 101. The eliminator 402 removes droplets of water, fluid, or liquid desiccant that were sprayed into the air by the spray washers 401. The eliminator(s) 402 can also serve as a heat exchanger for cooling or warming the intake air, as described in detail above. Some or all of the water, fluid, or liquid desiccant droplets containing contaminants will fall or flow into sump 407, in some embodiments being filtered and recirculated into other parts of the system. In this way, the quantity of contaminants reaching the media pads, membranes, or coils 101, and ultimately the sump 406, is reduced, increasing efficiency of the system and cleanliness of the exhaust air. Because LDAC systems recirculate the liquid desiccant from one sump to another, sometimes via pumps, less contamination of the liquid desiccant means less filtering is necessary, lowering fan power requirements, maintenance cost and effort allowing for the elimination of a filter or filters on the air intake.

Figure 4:
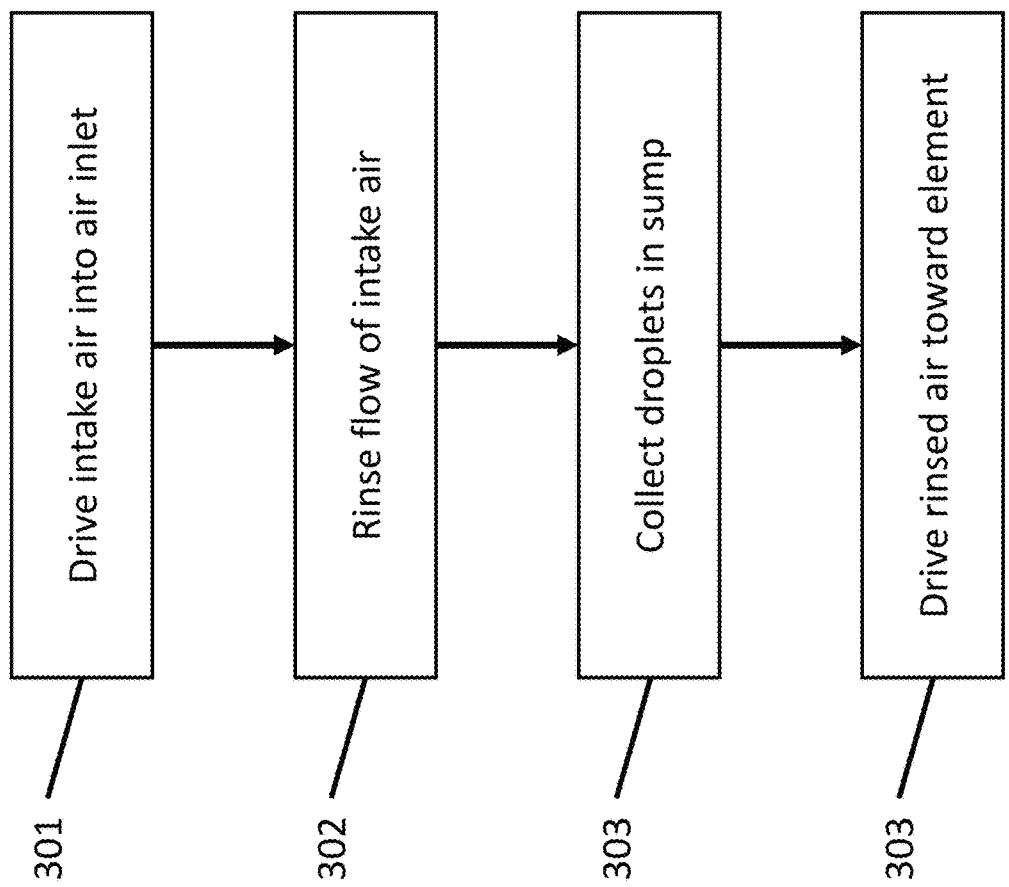
FIG. 4 is a diagram of a method of the present invention.

With reference now to FIG. 4, a method of the present invention is shown. As illustrated, a method of purifying intake air in an air conditioning unit comprises step 301 driving a flow of intake air into an air inlet, step 302 rinsing the flow of intake air with droplets of fluid from a spray washer, step 303 collecting a first quantity of droplets in a sump, positioned below the spray washer and the eliminator element, and step 304 driving the rinsed air toward a next active element.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A spray-type system for pre-filtering, pre-purifying, and pre-conditioning intake air in a liquid desiccant air conditioning unit, comprising:

an energy exchange unit having an air inlet, an air outlet, a primarily horizontal air flow running from the air inlet to the air outlet, and at least one next active energy exchanging element; and at least one spray washer having at least one nozzle oriented in a direction opposite the primarily horizontal air flow, the spray washer positioned between the air inlet and the at least one next active energy exchanging element;

wherein the at least one spray washer is configured to dispense droplets of liquid desiccant in a direction opposite the primarily horizontal air flow into the intake air from the at least one nozzle, pre-filtering, pre-purifying, and pre-conditioning the intake air;

wherein the at least one next active energy exchanging element is vertically oriented.

2. The system of claim 1, further comprising at least one eliminator element positioned between the spray washer and the at least one next active energy exchanging element, wherein the at least one eliminator element is configured to trap droplets of the liquid desiccant prior to the at least one next active energy exchanging element;

wherein the at least one eliminator element is vertically oriented.

3. The system of claim 2, further comprising at least one sump configured to catch the droplets of the liquid desiccant.

4. The system of claim 3, the at least one sump comprising a first sump positioned below the spray washer and a second sump positioned below at least one of the next active energy exchanging elements.

5. The system of claim 2, wherein the eliminator element or the spray washer is configured as a heat exchanger to change the temperature of the primary air flow.

6. The system of claim 1, wherein the energy exchange unit is selected from the group consisting of a conditioner unit and a recovery/regeneration unit.

7. The system of claim 1, further comprising a second fluid dispenser configured to dispense a second fluid, different from the liquid desiccant, to the at least one next active energy exchanging element.

8. The system of claim 1, further comprising:

a second active energy exchanging element;

a first fluid dispenser configured to dispense the liquid desiccant to the next active energy exchanging element; and a second fluid dispenser configured to dispense a second fluid to the second active energy exchanging element.

9. The system of claim 1, wherein the next active element is positioned substantially perpendicular to a primary air flow path.

10. The system of claim 1, further comprising a vertically-oriented media pad positioned between the at least one spray washer and the at least one next active energy exchanging element.

11. The system of claim 1, wherein the spray washer is positioned as the first element encountered by the horizontal airflow after entering the inlet.

12. A method of purifying intake air in an LDAC, comprising the steps of:

driving a flow of intake air into an air inlet of an LDAC;

rinsing the flow of intake air with droplets of liquid desiccant dispensed in a direction opposite the flow of intake air, from a spray washer;

collecting a first quantity of droplets in a sump, positioned below the spray washer and a next active element selected from the group consisting of an eliminator element, a media pad, a membrane, and a coil; and driving the rinsed air toward the next active element.

13. The method of claim 12, further comprising the step of catching remaining droplets with the next active element;

wherein the next active element is an eliminator element.

14. The method of claim 13, further comprising the step of changing the temperature of the liquid desiccant in the spray washer with a heat exchanger.

15. The method of claim 13, further comprising the step of changing the temperature of an element selected from the group consisting of the eliminator, a media pad, a membrane, and a coil with a heat exchanger.

16. The method of claim 12, further comprising the step of filtering a liquid comprising the first quantity of droplets and recirculating the filtered liquid into the spray washer.

17. The method of claim 12, further comprising, after the rinsing step, driving the rinsed air through a vertically-oriented media pad before driving the rinsed air toward the next active element.

18. The method of claim 12, wherein the spray washer is positioned as the first element encountered by the flow of intake air entering the inlet.

* * * * *